US008762949B2

(12) United States Patent
Conway et al.

(10) Patent No.: US 8,762,949 B2
(45) Date of Patent: Jun. 24, 2014

(54) METHOD AND APPARATUS FOR INCREMENTAL ANALYSIS OF ONE OR MORE PROPERTIES OF A PROGRAM

(75) Inventors: Christopher L. Conway, Brooklyn, NY (US); Dennis R. Dams, New Providence, NJ (US); Kedar S. Namjoshi, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 722 days.

(21) Appl. No.: 11/141,359

(22) Filed: May 31, 2005

(65) Prior Publication Data

US 2007/0006151 A1    Jan. 4, 2007

(51) Int. Cl.
*G06F 9/44*    (2006.01)

(52) U.S. Cl.
USPC ......................................................... 717/126

(58) Field of Classification Search
USPC ........................ 717/126, 131–133, 154–157
See application file for complete search history.

(56) References Cited

U.S. PATENT DOCUMENTS

| 5,230,050 | A * | 7/1993 | Iitsuka et al. ................. 717/155 |
| 6,571,386 | B1 * | 5/2003 | Figurin et al. ................. 717/154 |
| 6,820,256 | B2 * | 11/2004 | Fleehart et al. ................. 717/154 |
| 2006/0168565 | A1 * | 7/2006 | Gamma et al. ................. 717/122 |

OTHER PUBLICATIONS

Hermenegildo et al., "Incremental Analysis of Constraint Logic Programs", Mar. 2000, ACM Transaction on Programming Languages and Systems (TOPLAS), vol. 22, Issue 2, pp. 187-223.*

Oleg Sokolsky and Scott Smolka, "Incremental Model Checking in the Modal Mu-Calculus", 1994, CAV'94: Proceedings of the 6th International Conference on Computer Aided Verification, pp. 351-363.*
Vugranam Sreedhar, Guang Gao, and Yong-Fong Lee, "Incremental Computation of Dominator Trees", Mar. 1997, ACM Transactions on Programming Languages and Systems, vol. 19, No. 2, pp. 239-252.*
Vugranam Sreedhar, Guang Gao, and Yong-Fong Lee, "A New Framework for Exhaustive and Incremental Data Flow Analysis Using DJ Graphs", 1996, Proceedings on the ACM SIGPLAN 1996 conference on Programming Language Design and Implementation, pp. 278-290.*
Alur et al., "Analysis of Recursive State Machines," In CAV 2001, pp. 207-220 (2001).
Saha et al., "Incremental Evaluation of Tabled Logic Programs," In ICLP, vol. 2916 of LNCS, pp. 389-406 (2003).
Saha et al., "Incremental and Demand-driven Points-to Analysis Using Logic Programming," International Conference on Logic Programming, pp. 392-406 (2003.

(Continued)

*Primary Examiner* — Jue Louie
(74) *Attorney, Agent, or Firm* — Ryan, Mason & Lewis, LLP

(57) ABSTRACT

Methods and apparatus are provided for incremental analysis of one or more properties of a program. According to one aspect of the invention, at least one property of a software program is evaluated, given one or more changes to the software program. Nodes in a derivation graph are identified corresponding to changed edges in a control flow graph representation of the software program, wherein the derivation graph describes an earlier evaluation of the software program. In addition, at least one of the identified nodes in the derivation graph is updated and the derivation graph is traversed outward from a location of a change. The revised derivation graph can optionally be further processed to remove false errors.

17 Claims, 6 Drawing Sheets

(56) References Cited

OTHER PUBLICATIONS

Reps et al., "Precise Interprocedural Data flow Analysis via Graph Reachability," TR94-14, Datalogisk Institute, University of Copenhagen, Copenhagen, Denmark (Apr. 1994).

Henzinger et al., "Extreme Model Checking," Lecture Notes in Computer Science 2772, pp. 332-358 (2004).

Ramalingam et al., "A Categorized Bibliography on Incremental Computation," Proceedings of the $20^{th}$ ACM SIGPLAN-SIGACT Symposium, pp. 502-510 Charleston, SC (1993).

Yur et al., "An Incremental Flow- and Context-sensitive Pointer Aliasing Analysis," ICSE, Los Angeles, CA (1999).

Marlowe et al., "An Efficient Hybrid Algorithm for Incremental Data Flow Analysis," ACM Symposium, pp. 184-196 (1990).

* cited by examiner

FIG. 1
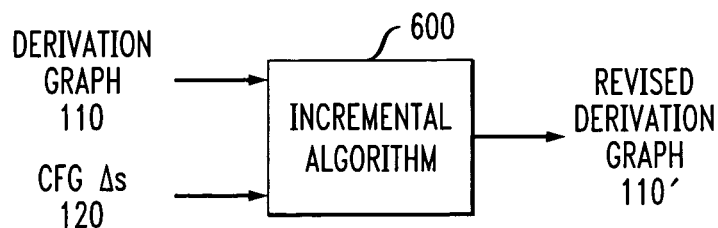
FIG. 2A
```
int *p, x, y ;
setp() { if C then p = &x ; }
usep() { y = *p ; }
main() { setp() ; usep() ; }
```
FIG. 2B
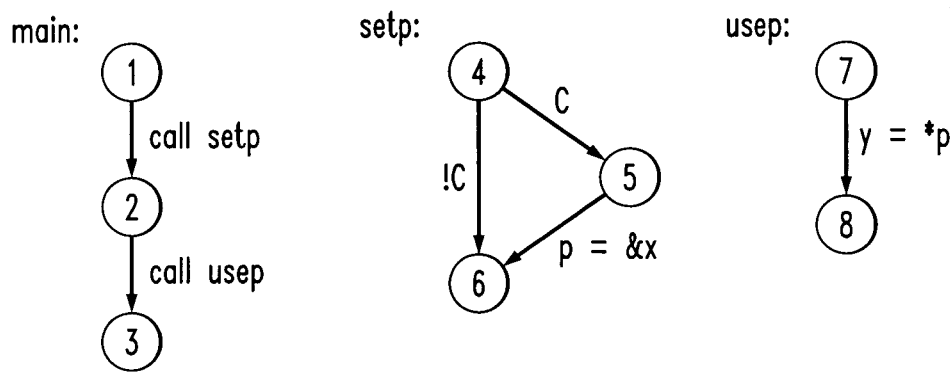

*FIG. 4*

```
ADD-TO-WORKSET(c)                                    ⸺410

1   if c is not marked then
2       workset ← workset ∪ {c}
3       mark c

FOLLOW-EDGE(c, e)                                    ⸺420

1   // c=(f,n,r,q), e=(n,a,n')
2   if a = call(f') then
3       //use summaries; do book-keeping
4       ADD-TO-WORKSET((f', ↓, q, q))
5       Add c to call-sites(f')
6       for q' : ⟨q, q'⟩ ∈ summary(f') do
7           ADD-TO-WORKSET((f, n', r, q'))
8   else
9       // follow automaton transition
10      for q' ; (q, a, q') ∈ Δ do
11          ADD-TO-WORKSET((f, n', r, q'))

STEP(c = (f,n,r,q))                                  ⸺430

1   if q ∈ F then
2       REPORT-ERROR(c)
3   if n =↑ then
4       // add a summary pair
5       Add ⟨r, q⟩ to summary(f)
6       workset ← workset ∪ call-sites(f)
7   else
8       //follow a CFG edge
9       for e ∈ edges(n) do
10          FOLLOW-EDGE(c, e)

ANALYZE                                              ⸺450

1   workset ← {(main, ↓, q, q) | q ∈ Q̂}
2   while workset ≠ ∅ do
3       Remove some c ∈ workset
4       STEP(c)
```

ADD-TO-WORKSET(c) ⟋510
1  if c is not marked then
2     workset ← workset ∪ {c}
3     mark c CHECK-EDGE(e = c ⊢$_a$ c') ⟋520
1  // c=(f,n,r,q), c'=(f,n',r,q')
2  if (n, a, n') is a deleted edge then
3     skip
4  elseif a = call(f') then
5     //use stored summaries
6     ADD-TO-WORKSET((f', ↓, q, q))
7     Add c to call-sites(f')
8     if ⟨q, q'⟩ is marked in f' then
9        ADD-TO-WORKSET(c'); mark e
10 else
11    ADD-TO-WORKSET(c'); mark e CHECK-STEP(c = (f,n,r,q)) ⟋530
1  if n =↑ then
2     Mark the summary ⟨r, q⟩ in f
3     workset ← workset ∪ call-sites(f)
4  else
5     for each deriv. edge e from c do
6        CHECK-EDGE(e)

CHECK-DERIVATIONS(Fns) ⟋540
1  for f ∈ Fns do
2     Unmark f's configs, edges,
         summaries, and call sites that
         originate in Fns
3  workset ← EXT-INITS(Fns)
4  while workset ≠ ∅ do
5     Choose and remove c ∈ workset
6     CHECK-STEP(c)
7  Remove unmarked elements

*FIG. 6*

```
RETRACE(c = (f,n,r,q))
1  if c is not marked then
2      return false
3  elseif f = main then
4      return true
5  else
6      return ( ∃c' = (f', n', r', r):
                  c' ∈ call-sites(f) ∧ RETRACE(c'))

INCR-BACK()
1  // bottom-up repair
2  for each SCC C (in reverse
       topological order) do
3      if AFFECTED(C) then
           CHECK-DERIVATIONS(C)
5  // remove unreachable errors
6  for each error configuration c do
7      if (not RETRACE(c)) then
8          unmark c
```

METHOD AND APPARATUS FOR INCREMENTAL ANALYSIS OF ONE OR MORE PROPERTIES OF A PROGRAM

FIELD OF THE INVENTION

The present invention relates to the evaluation of software programs and, more particularly, to methods and apparatus for the incremental analysis of software programs.

BACKGROUND OF THE INVENTION

The design and testing of software is often an expensive and time-consuming process. Tools based on model checking with automaton specifications have been very effective at finding important bugs such as buffer overflows, memory safety violations, and violations of locking and security policies. Static analysis tools and model checking tools are typically based on inter-procedural algorithms for propagating dataflow information. These algorithms perform a reachability analysis that generally starts from scratch. For small program changes, however, which typically have only a localized effect on the analysis, a non-incremental ("from scratch") approach can be inefficient.

At least one technique has been proposed or suggested for the incremental evaluation of logic programs. See, D. Saha and C. Ramakrishnan, Incremental Evaluation of Tabled Logic Programs, ICLP, 392-406, Mumbai, India (2003); or D. Saha and C. Ramakrishnan, Incremental and Demand Driven Points-to Analysis Using Logic Programming, Principles and Practice of Declarative Programming (2005). Several program analysis problems can be cast as a logic program. Incremental program analyzers are disclosed that compute the changes to the analysis information due to small changes in the input program rather than reanalyzing the entire program. The disclosed incremental program analyzers operate in the forward direction from the initial states.

While such incremental program analyzers can effectively compute the changes to analysis information due to small changes in the input program, they suffer from a number of limitations, which if overcome, could further improve the utility and efficiency of incremental program evaluation techniques. For example, such forward incremental analysis techniques reanalyze portions of the program, leading to inefficiencies. In addition, prior incremental program analyzers require translation of software programs, such as C++ programs, to logic programs, leading to further inefficiencies.

A need therefore exists for incremental algorithms for inter-procedural analysis that operate in a backward direction, "inside-out" from the locations of the program changes.

SUMMARY OF THE INVENTION

Generally, methods and apparatus are provided for incremental analysis of one or more properties of a program. According to one aspect of the invention, at least one property of a software program is evaluated, given one or more changes to the software program. Nodes in a derivation graph are identified corresponding to changed edges in a control flow graph representation of the software program, wherein the derivation graph describes an earlier evaluation of the software program. In addition, at least one of the identified nodes in the derivation graph is updated and the derivation graph is traversed outward from a location of a change. The revised derivation graph can optionally be further processed to remove false errors.

According to another aspect of the invention, nodes in the derivation graph are updated by (i) computing a strongly connected component (SCC) decomposition of a function call graph in the software program; (ii) identifying an SCC having an unprocessed program change and a lowest position in the SCC decomposition; (iii) performing a forward incremental analysis on the identified SCC to process the program change in the SCC; (iv) evaluating one or more interfaces of the identified SCC to identify one or more additional SCCs affected by the program change until no interfaces are affected; and (v) repeating the identifying, performing and evaluating steps for a next SCC having an unprocessed program change and a lowest position in the software program.

A more complete understanding of the present invention, as well as further features and advantages of the present invention, will be obtained by reference to the following detailed description and drawings.

BRIEF DESCRIPTION OF THE DRAWINGS

FIG. 1 is a block diagram illustrating an incremental algorithm in accordance with the present invention;

FIG. 2A illustrates code for an exemplary program;

FIG. 2B illustrates the control flow graphs associated with the exemplary program of FIG. 2A;

FIG. 4 illustrates exemplary pseudo-code for a non-incremental analysis algorithm;

FIG. 5 illustrates exemplary pseudo-code for a forward-traversing deletion algorithm (IncrFwd); and FIG. 6 illustrates exemplary pseudo-code for deletion for a strongly connected component (SCC)-based algorithm (IncrBack) incorporating features of the present invention.

DETAILED DESCRIPTION

Figure 2C:
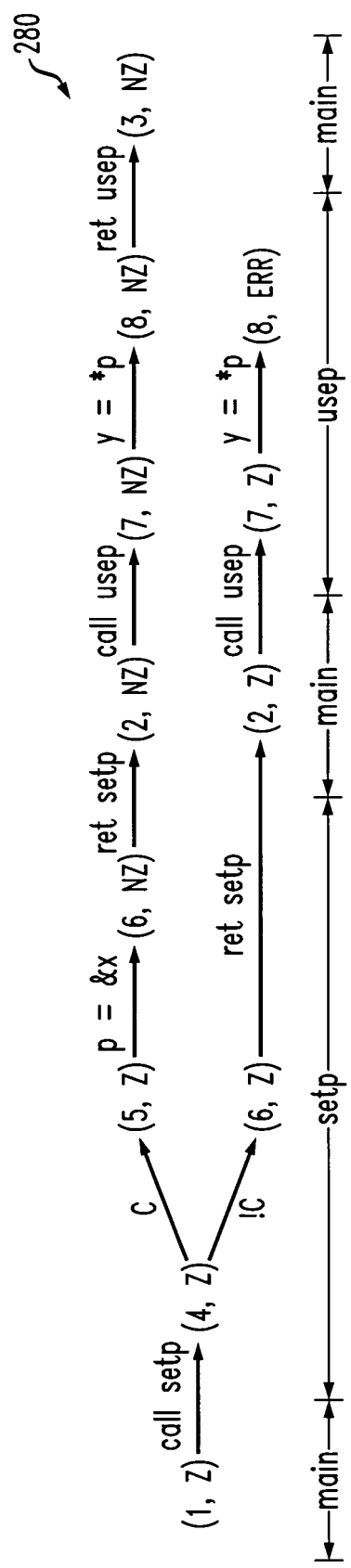
FIG. 2C illustrates the resulting derivation graph for the program of FIG. 2A.

The present invention provides incremental algorithms for inter-procedural analysis of a correctness property of a program. The present invention employs a data structure referred to as a derivation graph or a state transition graph that records the analysis process. Generally, in response to a program change, the algorithms re-check derivations recorded in this graph, pruning those that have been invalidated due to the change and adding new ones. This repair process results in a new derivation graph, which is stored and used for the following increment.

The input to a conventional, non-incremental algorithm, as discussed further below in conjunction with FIG. 4, is typically a program, described by a collection of control flow graphs (CFGs), and a checking automaton. FIG. 1 is a block diagram illustrating an incremental algorithm 600 in accordance with the present invention, as discussed further below in conjunction with FIG. 6. As shown in FIG. 1, the input to the incremental algorithm 600 is a derivation graph 110 and set 120 of additions, deletions, and modifications to CFG edges, shown in FIG. 1 as "CFG Δs." The incremental algorithm 600 generates a revised derivation graph 110'.

The nodes of a CFG represent control locations, while edges are labeled either with simple assignment statements, (side-effect free) assertions, or function calls. In the model checking view, the (possibly non-deterministic) checking automaton "runs" over matched call-return paths in this collection of CFGs, flagging a potential program error whenever the current run enters an error state.

A basic model checking algorithm works by building, on-the-fly, a "synchronous product" graph of the collective CFGs with the automaton. At a function call edge, this product is constructed by consulting a summary cache of entry-exit automaton state pairs for the function. Using this cache has two consequences: it prevents indefinite looping when following recursive calls and it exploits the hierarchical function call structure, so that function code is not unnecessarily re-examined.

The incremental version of the algorithm observes that the process of forming the synchronous product can be recorded as a derivation graph 110. After a small change to the CFGs, it is likely that most of the process of forming the synchronous product is a repetition of the earlier effort. By storing the previous graph 110, this repetitive calculation can be avoided by checking those portions that may have been affected by the change, updating derivations only when necessary.

FIG. 2A provides code for an exemplary program 200. In an exemplary implementation, the correctness property being evaluated is whether a global pointer, p, is initialized to a non-null value before being dereferenced. A simple automaton (not shown) to check for violations of this property has three states: Z, indicating p may be null; NZ, indicating p is not null; and the error state ERR indicating p is dereferenced when it may be null.

FIG. 2B illustrates the CFGs 250 for the program 200 of FIG. 2A. FIG. 2C illustrates the resulting derivation graph 280 for the program 200 of FIG. 2A (in this case a tree). Each node in the derivation graph 280 is the combination of a CFG node and an automaton state. If condition C holds on entry to setp (the upper branch from the state (4; Z) in setp), the function returns to main with the automaton state NZ, and execution proceeds normally to termination. If C does not hold (the lower branch), setp returns to main with the automaton state Z. On the statement "y=*p", the automaton moves to the state ERR and an error is reported in usep.

The incremental algorithm 600 of the present invention operates on the data structure of the derivation graph 280. As previously indicated, the input to the incremental algorithm 600 also consists of additions, deletions, and modifications to CFG edges (CFG Δs). Generally, each derivation step is inspected to determine whether it is affected by a change; if so, remove the derivation and re-check the graph from the affected point until a previously explored state is encountered.

Figure 3A:
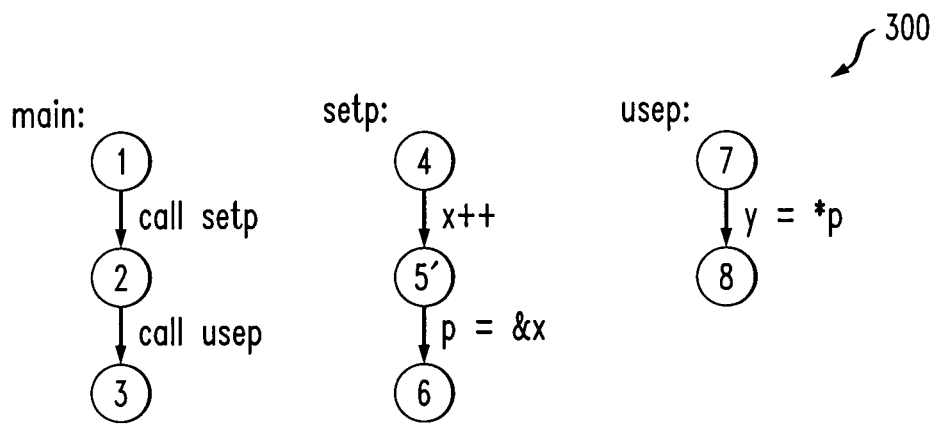
FIG. 3A illustrates revised the control flow graphs for a modified version of the program of FIG. 2A.
Figure 3B:
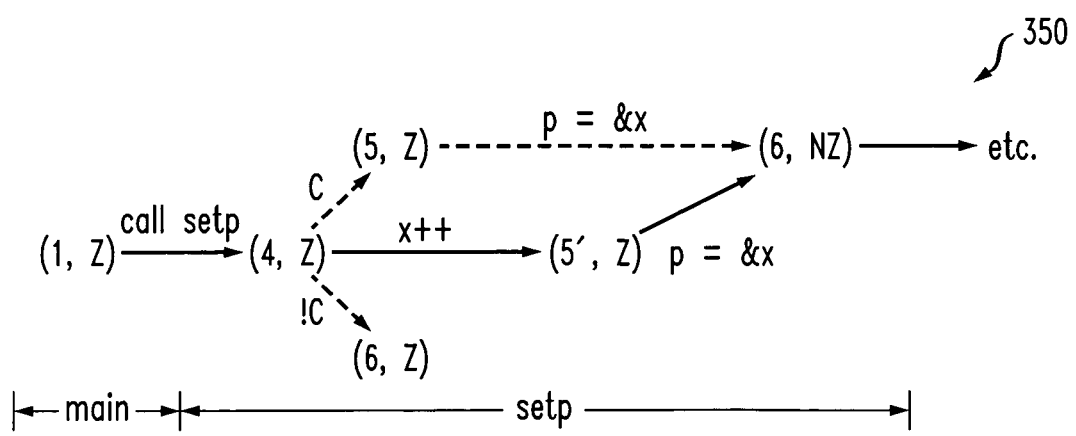
FIG. 3B illustrates the incremental effect on a derivation graph for the modified version of the program shown in FIG. 3A.

FIG. 3A illustrates the revised CFGs 300 for a modification to the program 200 of FIG. 2A that replaces the body of setp( ) with the statement "x++; p=&x;". FIG. 3B is an updated derivation graph 350 illustrating the incremental effect 280 on the derivation graph of FIG. 2C for the modified version of the program 200. The removal of the if statement from the program 200 has the effect of removing the conditional branch edges (dashed) from the graph 280, making the previous error state unreachable. The addition of x++ has the effect of adding the state (5'; Z) and two edges (bold) to the graph 350. After processing these edges, evaluation proceeds to state (6; NZ), which is identical to the corresponding state in the previous analysis.

The present invention provides incremental algorithms for inter-procedural analysis that operate in a backward direction, "inside-out" from the locations of the program changes. In order to understand the "backwards" incremental algorithms of the present invention, an understanding is necessary of an existing non-incremental (full) algorithm, and a proposed forward incremental algorithm.

Full Analysis Algorithm

A program is given as a set F of functions, with a distinguished initial function, main. Each function is represented by a CFG, which is a tuple $(N, \Sigma, E)$. Here, N is a finite set of control locations containing the distinguished locations $\downarrow$ (entry) and $\uparrow$ (exit); $\Sigma$ is a set of (simple) program statements (assignments and assertions); and E is the set of edges. Let $\Sigma'$ be $\Sigma$ together with call statements $\{\text{call }(f)|f \in F\}$. E is a subset of $(N\backslash\{\uparrow\})\times\Sigma'\times N$. It is required that there are no calls to functions outside F. For simplicity of exposition, function call arguments and return values, or variables and their scoping rules are not represented.

Next the executions of a program are defined. A position is a pair (f,n), where f is a function and n is a node in (the CFG for) f. A (global) program state is a sequence $(f_1,n_1) \ldots (f_k,n_k)$ of positions, representing a point during execution where control resides at position $(f_k,n_k)$ and $(f_1,n_1) \ldots (f_{k-1},n_{k-1})$ is the stack of return locations that is in effect at this point. A labeled transition system is defined on program states, as follows.

1. $(f_1, n_1) \ldots (f_k, n_k) \xrightarrow{a} (f_1, n_1) \ldots (f_k, n'_k) \text{ iff } (n_k, a, n'_k)$ is an edge in $f_k$ and is not a call $(f_1,n_1) \ldots (f_k,n_k) \rightarrow (f_1,n_1) \ldots (f_k,n'_k)(f',\downarrow) \text{ iff } (n_k,\text{call}(f'), n'_k)$  2.

is an edge in $f_k$ $(f_1,n_1) \ldots (f_{k-1},n_{k-1})(f_k,\uparrow) \rightarrow (f_1,n_1) \ldots (f_{k-1},n_{k-1})$  3.

An execution is a finite path in this transition system that begins with the program state (main; $\downarrow$), consisting of just the initial position. Such an execution generates a trace consisting of the sequence of labels (which are program statements) along it. Note that this is the definition of a recursive state machine, restricted to the case of finite executions.

Analysis properties are represented by (non-deterministic, error detecting) automata with $\Sigma$ as input alphabet. An analysis automaton is given by a tuple $(Q, I, \Delta, F)$, where Q is a set of (automaton) states, $I \subseteq Q$ is a set of initial states, $\Delta \subseteq Q \times \Sigma \times Q$, is a transition relation, and $F \subseteq Q$ is a set of rejecting states. A run of the automaton on a trace is defined in the standard way. A rejecting run is a run that includes a rejecting state. Note that in this simplified presentation, the set $\Sigma$ of program statements does not include function calls and returns, and hence the automata cannot refer to them. In the implementation, transitions that represent function calls and returns (rules 2 and 3 above) carry special labels, and the error detecting automaton can react to them by changing its state, e.g., to perform checks of the arguments passed to a function, or the value returned by it.

An automaton operates on the syntax of the program; the relationship with the semantics is up to the automaton writer. For instance, one might define an under-approximate automaton, so that any error reported by the automaton check is a real program error, but it might not catch all real errors. It is more common to define an over-approximate automaton, so that errors reported are not necessarily real ones, but the checked property holds if the automaton does not find any errors.

FIG. 4 illustrates pseudo-code 400 for the from-scratch (non-incremental) analysis algorithm (Full). The full algorithm 400 keeps global configurations in a work-set; each configuration is a tuple (f,n,r,q), where (f,n) is a position and r,q are automaton states. The presence of such a configuration in the work-set indicates that it is possible for a run of the automaton to reach position (f,n) in automaton state q as a result of entering f with automaton state r (the "root" state). In addition, the algorithm 400 keeps a set of summaries for each function, which are entry-exit automaton state pairs, and a set of known call-sites, which are configurations from which the function is called. Analyze 450 repeatedly chooses a configuration from the work-set and calls step 430 to generate its successors. In step, if the automaton is in an error state, a potential error is reported. (In an implementation, the report-error procedure may also do additional work to check if the error is semantically possible).

As shown in FIG. 4, much of the work is done in the follow-edge procedure 420. For a non-call statement, the procedure 420 follows the automaton transition relation (Line 10). For a function call, the procedure 420 looks up the summary table to determine successor states (Line 6). If there is no available summary, registering the current configuration in call-sites (f) and creating a new entry configuration for f' ensures that a summary entry will be created later, at which point this configuration is re-examined (Line 6 in step 430). It is assumed that visited configurations are kept in a suitable data structure (e.g., a hash-table).

The full algorithm 400 reports an error at a configuration (f, n, r, q), for some r, q, if and only if there is a program execution ending at a position (f, n), labeled with trace t, such that the automaton has a rejecting run on t.

Forward Incremental Algorithm

A. Input

As previously indicated, a textual program change can be reflected in the CFGs as the addition, deletion, or modification of control-flow edges. A textual program change can also result in the redefinition of the number and types of variables. The forward incremental algorithm expects as input CFG changes, and repairs the derivation graph accordingly. Changes to types and variables correspond to automaton modifications. The forward incremental algorithm 500, discussed further below in conjunction with FIG. 5, can be modified for the situation where the property (and not the program) changes, since the joint (i.e., product) derivation graph is maintained.

B. Data Structure

The forward incremental algorithm 500 records a derivation relation on configurations in the procedure follow-edge 420. Whenever a new configuration of the form (f,n',r,q') is added after processing a configuration (f,n,r,q) and an edge $\alpha$, a derivation edge $(f,n,r,q)|-_{\alpha}(f,n',r,q')$ is recorded. This results in a labeled and directed derivation graph. Notice that the derivation graph can be viewed also as a tableau proof that justifies either the presence or absence of reachable error states.

Given as input a set of changes to the CFGs and a derivation graph, the exemplary forward incremental algorithm 500 first processes all the modifications, then the deletions, and finally the additions. This order avoids excess work where new configurations are added only to be retracted later due to CFG deletions.

C. Modifications

For an edge e=(n,a,n') modified to e'=(n,b,n') in function $f$, if each derivation of the form $(f,n,r,q)|_{\alpha}(f,n',r,q')$ holds also for the new statement b (which is checked by code similar to that in follow-edge 420) there is no need to adjust the derivation graph. Otherwise, the modification is handled as the deletion of edge e and the addition of e'.

D. Additions

For a new edge e=(n,a,n') in the CFG off, follow-edge 420 is applied to all configurations of the form c=(f,n,r,q), for some r,q, that are present in the current graph. Consequently, any newly generated configurations are processed as in the full algorithm 400.

E. Deletions

Deletion is the non-trivial case and is shown in further detail in FIG. 5. Generally, the idea is to check all of the recorded derivation steps, disconnecting those that are based on deleted edges. FIG. 5 illustrates pseudo-code 500 for an exemplary forward-traversing deletion algorithm 500 (IncrFwd). The entry point is a procedure check-derivations 540, that is called with the full set of functions, F. The auxiliary function ext-inits (f) (line 3) returns the set of entry configurations for functions in F that arise from a call outside F. The initial configurations for main are considered to have external call sites. This gives a checking version of the full analysis algorithm. Checking an existing derivation graph can be expected to be faster than regenerating it from scratch with the full algorithm 400. The savings can be quite significant if the automaton transitions $\Delta$ are computed on-the-fly (note that the algorithm 500 does not re-compute $\Delta$). The derivation graph resulting from the IncrFwd algorithm 500 is essentially the same as the graph generated by the full analysis algorithm 400 on the modified CFGs.

Backward Incremental Algorithm

The IncrFwd algorithm 500 of FIG. 5 checks derivations in a forward traversal, which may result in unnecessary work. If only a function g is modified, functions that are not on any call path that includes g are not affected, and do not need to be checked. Moreover, if the change to g does not affect its summary information, even its callers do not need to be checked. Such situations can be detected with an "inside-out" algorithm, based on a maximal strongly connected component (SCC) decomposition of the function call graph. (A non-trivial, maximal SCC in the call graph represents a set of mutually recursive functions.) The effect of a CFG edge deletion from a function $f$ propagates both upward and downward in the call graph. Since some summary pairs for f may no longer be valid, derivations in f's callers might be invalidated. In the other direction, for a function called by f, some of its entry configurations might now be unreachable.

FIG. 6 illustrates exemplary pseudo-code for deletion for an SCC-based algorithm 600 (IncrBack). It works bottom-up on the SCC decomposition, checking first the lowest (in topological order) SCC that is affected. The function affected (line 3) checks whether a function in C is modified, or whether summaries for any external function called from C have been invalidated. For each SCC, C, one can inductively assume that summaries for functions below C are valid. Hence, it is only necessary to examine functions in C. This is done by the same check-derivations procedure 540 of FIG. 5, only now applied to a single SCC instead of the full program. Note that check-derivations 540 initially invalidates summaries in C that cannot be justified by calls outside C.

This process can result in over-approximate reachability information. Consider a scenario where f calls g. Now suppose that f is modified. The algorithm repairs derivations in f, but does not touch g. However, derivations in f representing calls to g might have been deleted, making corresponding entry configurations for g unreachable. To avoid reporting spurious errors resulting from this over-approximation, the (nondeterministic) retrace procedure re-determines reachability for all error configurations.

The derivation graph 110' following execution of the Incr-Back algorithm 600 is an over-approximation of the graph 110 generated by the full analysis algorithm on the modified CFGs, but has the same set of error configurations.

Incremental model checking may have benefits beyond speeding up analysis. For example, the speed gain from incremental analysis may be used for higher precision in order to reduce the number of false errors reported. In addition, a fine-grained incremental model checker can be integrated into a program development environment, so that program errors are caught immediately. In another variation, an incremental model checker can be used to enable correct-by-construction development. In this scenario, instead of applying model checking after a program is written, an incremental model checker can maintain and update a proof of correctness during program development.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for evaluating at least one property of a software program given one or more changes to said software program, said method comprising the steps of:
    identifying nodes in an automaton-based derivation graph corresponding to changed edges in a control flow graph representation of said software program, wherein said automaton-based derivation graph describes an earlier evaluation of said software program; and
    updating at least one of said identified nodes in said automaton-based derivation graph and traversing said automaton-based derivation graph outward from a location of a change, wherein said updating step further comprises the steps of:
        computing a strongly connected component (SCC) decomposition of a function call graph in said software program;
        identifying an SCC having an unprocessed program change and a lowest position in said SCC decomposition;
        performing a forward incremental analysis on said identified SCC to process said program change in said SCC;
        evaluating one or more interfaces of said identified SCC to identify one or more additional SCCs affected by said program change until no interfaces are affected; and
        repeating said identifying, performing and evaluating steps for a next SCC having an unprocessed program change and a lowest position in said software program.

2. The method of claim 1, further comprising the step of generating a revised automaton-based derivation graph describing an analysis of said software program incorporated with said given one or more changes.

3. The method of claim 2, wherein said revised automaton-based derivation graph maintains less information than a full automaton-based derivation graph.

4. The method of claim 2, further comprising the step of processing said revised automaton-based derivation graph to remove false errors.

5. The method of claim 4, wherein said false errors are associated with unreachable errors.

6. The method of claim 1, wherein said software program is expressed as a collection of said control flow graphs.

7. The method of claim 1, wherein said one or more changes to said software program comprise a modification, addition or deletion of one or more program statements.

8. The method of claim 1, wherein said property is the presence of a program bug detectable by a checking automaton.

9. An apparatus for evaluating at least one property of a software program given one or more changes to said software program, the apparatus comprising:
    a memory; and
    at least one processor, coupled to the memory, operative to:
        identify nodes in a automaton-based derivation graph corresponding to changed edges in a control flow graph representation of said software program, wherein said automaton-based derivation graph describes an earlier evaluation of said software program; and
        update at least one of said identified nodes in said automaton-based derivation graph and traversing said automaton-based derivation graph outward from a location of a change,
    wherein said processor is further configured to:
        compute a strongly connected component (SCC) decomposition of a function call graph in said software program;
        identify an SCC having an unprocessed program change and a lowest position in said SCC decomposition;
        perform a forward incremental analysis on said identified SCC to process said program change in said SCC;
        evaluate one or more interfaces of said identified SCC to identify one or more additional SCCs affected by said program change until no interfaces are affected; and
        repeat said identifying, performing and evaluating steps for a next SCC having an unprocessed program change and a lowest position in said software program.

10. The apparatus of claim 9, processor is further configured to generate a revised automaton-based derivation graph describing an analysis of said software program incorporated with said given one or more changes.

11. The apparatus of claim 10, wherein said revised automaton-based derivation graph maintains less information than a full automaton-based derivation graph.

12. The apparatus of claim 10, processor is further configured to process said revised automaton-based derivation graph to remove false errors.

13. The apparatus of claim 12, wherein said false errors are associated with unreachable errors.

14. The apparatus of claim 9, wherein said software program is expressed as a collection of said control flow graphs.

15. The apparatus of claim 9, wherein said one or more changes to said software program comprise a modification, addition or deletion of one or more program statements.

16. The apparatus of claim 9, wherein said property is the presence of a program bug detectable by a checking automaton.

17. An article of manufacture for evaluating at least one correctness property of a software program given one or more changes to said software program, comprising a non-transitory machine readable storage medium containing one or more programs which when executed implement the steps of:
    identifying nodes in a automaton-based derivation graph corresponding to changed edges in a control flow graph representation of said software program, wherein said automaton-based derivation graph describes an earlier evaluation of said software program; and
    updating at least one of said identified nodes in said automaton-based derivation graph and traversing said automaton-based derivation graph outward from a location of a change, wherein said non-transitory machine readable storage medium contains one or more programs which when executed further implement the steps of:
computing a strongly connected component (SCC) decomposition of a function call graph in said software program;
identifying an SCC having an unprocessed program change and a lowest position in said SCC decomposition;
performing a forward incremental analysis on said identified SCC to process said program change in said SCC;
evaluating one or more interfaces of said identified SCC to identify one or more additional SCCs affected by said program change until no interfaces are affected; and
repeating said identifying, performing and evaluating steps for a next SCC having an unprocessed program change and a lowest position in said software program.

* * * * *